United States Patent [19]
Coingt et al.

[11] 3,949,063
[45] Apr. 6, 1976

[54] REGENERATION OF A ANTHRAQUINONE WORKING SOLUTION BY CONTINUOUS MULTI-STAGE THIN FILM DISTILLATION

[75] Inventors: Michel Coingt, Grenoble; Pierre Thirion, Poisat, both of France

[73] Assignee: Oxysynthese, Paris, France

[22] Filed: Nov. 6, 1974

[21] Appl. No.: 521,471

Related U.S. Application Data

[63] Continuation of Ser. No. 306,423, Nov. 14, 1972, abandoned.

[30] Foreign Application Priority Data
Nov. 18, 1971 France .............................. 71.41313

[52] U.S. Cl. .................... 423/588; 203/42; 203/89; 203/73; 260/396 R
[51] Int. Cl.² ........................................ C01B 15/02
[58] Field of Search ............ 203/89, 72, 73, 42, 80, 203/90, 91, 28; 423/582, 588, 589, 590; 260/590; 55/32, 68, 83, 84, 85, 89, 93, 94

[56] References Cited
UNITED STATES PATENTS
2,751,338   6/1956   Schwemberger...................... 203/89
2,751,339   6/1956   Inman................................... 203/89

FOREIGN PATENTS OR APPLICATIONS
1,335,700   7/1963   France................................ 423/590
1,059,317   2/1967   United Kingdom................. 423/588
1,118,165   11/1961  Germany............................ 423/590

Primary Examiner—Norman Yudkoff
Assistant Examiner—Frank Sever
Attorney, Agent, or Firm—Browdy and Neimark

[57] ABSTRACT

A process for regenerating working solutions used in cyclic processes for the manufacture of hydrogen peroxide using anthraquinones, the process consisting of a first distillation stage in which the solvent is separated under a pressure not greater than atmospheric pressure, and a second distillation stage in which the quinones and "light degraded products" are separated under a lower pressure. All the distillation products are used as a new working solution, the vapors of the second distillation stage being condensed on a liquid film of constantly renewed cold solvent originating from condensable vapors of the first distillation stage.

5 Claims, 1 Drawing Figure

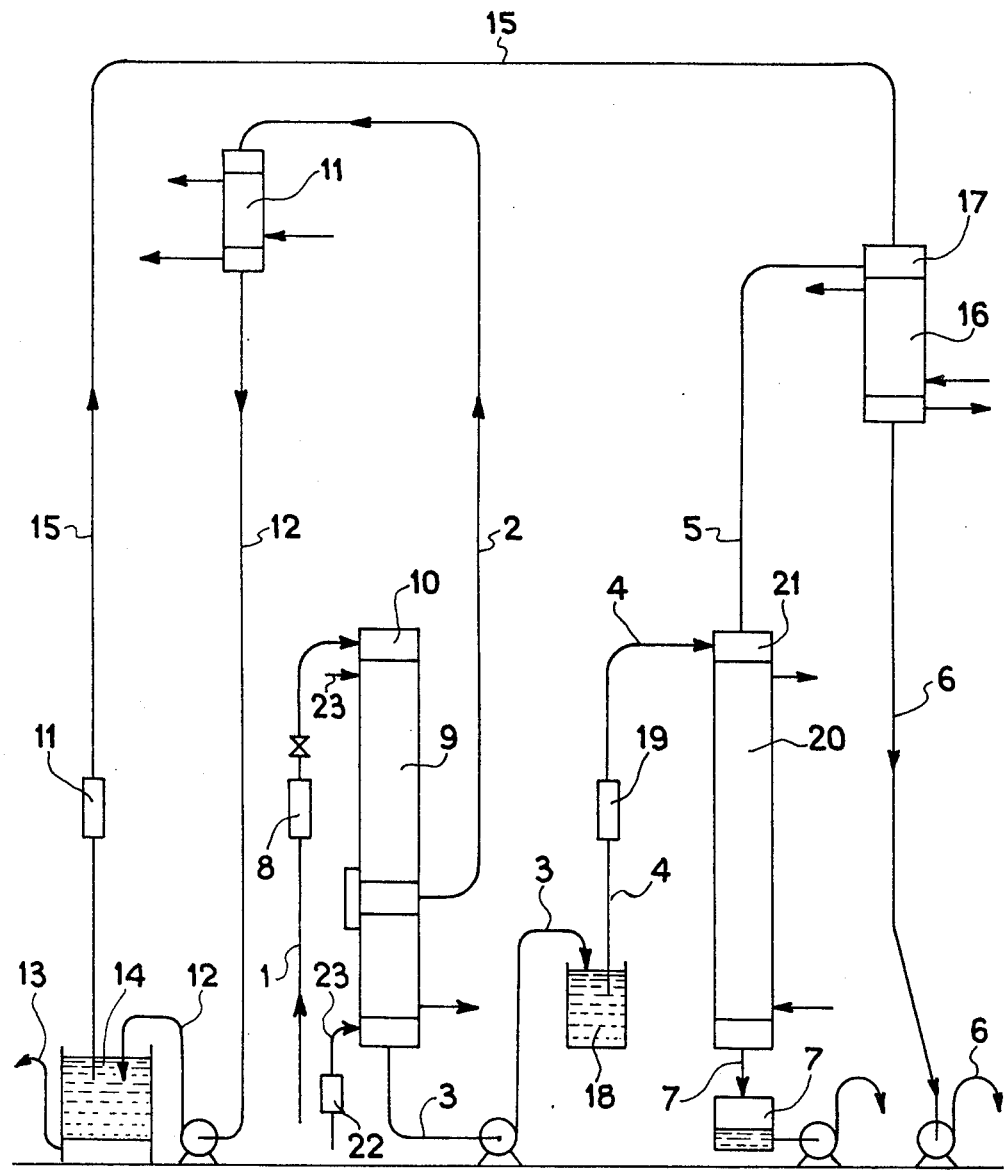

REGENERATION OF A ANTHRAQUINONE WORKING SOLUTION BY CONTINUOUS MULTI-STAGE THIN FILM DISTILLATION

CROSS-REFERENCE TO RELATED APPLICATION

This is a continuation of application Ser. No. 306,423 filed Nov. 14, 1972, now abandoned.

BACKGROUND OF THE INVENTION

This invention relates to the manufacture of hydrogen peroxide.

Processes using anthraquinones for the production of $H_2O_2$ operate on the basis of a cycle comprising hydrogenation, in the presence of a catalyst, of anthraquinones dissolved in a solvent; oxidation of the hydroanthraquinones which are thus obtained to produce hydrogen peroxide; and extraction of the $H_2O_2$ generally by contact of water with the solution formed in the oxidation, the exhausted, or spent, solution being returned to the hydrogenation stage. It is known that these operations are accompanied by secondary reactions which transform the quinones into reduction products which do not generate hydrogen peroxide and these are designated "degraded substances" of the working solution. The consequence of this is a progressive reduction in the power of the solution to generate hydrogen peroxide. However, it is well known that this loss in power can be limited by introducing a supplementary operation, generally called "reconversion", into the operating cycle, the supplementary operation generally consisting in bringing all or part of the working solution into contact with a reconversion catalyst, this being effected continuously or intermittently, whereby some of the "degraded substances " are reconverted into active quinones, i.e. generators of $H_2O_2$, which will be the anthraquinone being used or its nuclear hydrogenation derivative, the corresponding tetra-5,6,7,8-anthraquinone. However, generally some of the degraded substances are not reconverted into quinones, the reconversion reactions being too slow or the degradations being irreversible. Thus, the working solution is gradually enriched with "inert products", the concentration of which can reach a value which is prejudicial to the good functioning of the process.

There is in fact observed progressively a more rapid and more considerable soiling of the hydrogenation and reconversion catalysts, which is shown by an increased consumption of these latter materials, a soiling of the filters, and an accumulation of deposits at the interfaces of the $H_2O_2$ solution and working solution during the extraction of the $H_2O_2$. Analysis shows the presence, in these solutions, of polyanthracene compounds with a phenol function, which can be held responsible for the disadvantages referred to above. As well as these polyanthracene products, which can be designated as "heavy degraded products", there are other monoanthracene degradation products which can be designated "light degraded products". As the degraded products have the advantage of increasing the solubility of the quinones and especially of the hydroquinones, attempts have been made to free the working solution from the harmful part of said products, namely the "heavy degraded products". Different processes have been described, which comprise either chemical operations or physical operations or combinations of the two types of operation, but they frequently have the disadvantage that the process is complex and/or the disadvantage that secondary chemical reactions are involved in cases where chemical reagents are used.

SUMMARY OF THE INVENTION

According to the present invention there is provided a process for regenerating a working solution used in a cyclic process for the manufacture of hydrogen peroxide employing anthraquinones, which process comprises a first distillation stage in which solvent is separated from the working solution, under a pressure not greater than atmospheric pressure, and a second distillation stage in which quinones and monoanthracene "light degraded products" are separated from the product of the first distillation stage, under a pressure lower than the pressure employed in the first distillation stage, wherein the distillation products of the first and second distillation stage are used as a new working solution, the vapors formed in the second distillation stage being condensed on a liquid film of cold solvent which is being constantly renewed and which originates from the vapors condensed in the first distillation stage.

The process of the present invention, which is based on the relative volatilities of the products to be separated, makes use of a technique for evaporation which permits a sufficient fractionation to occur with minimal damage caused to the products to be recovered because of a relatively short heating time.

The process of the present invention thus permits a working solution which is employed in a process for manufacturing $H_2O_2$ using anthraquinone to be regenerated without losing the advantage of the high solubility of the quinones, thereby obtaining high productivity per litre of solution of quinones. Another advantage is that the consumption of catalysts in the hydrogenantion and the reconversion steps is reduced by virtue of a better reactivity of the solution.

The principle of the distillation resulting in the recovery of the active products, i.e. the quinones, has already been described in French Patent Specification No. 1,335,700. However, apart from the fact that the conditions of use were not specified, it is implied that there are formed acid products which it is necessary to remove by washing.

According to another aspect of the invention there is provided an installation for regenerating a working solution used in a cyclic process for the manufacture of hydrogen peroxide employing anthraquinones which comprises a first evaporator for effecting distillation of the solvent, a first condenser to which the solvent vapor is conducted, a second evaporator for effecting the distillation of the molten dry extract separated at the base of the first evaporator, and a second condenser formed by an exchanger having a wall of which one of the faces is adapted to be in contact with a cooling fluid while the other face, on which are condensed the vapors of quinones and light degraded products separated in the second evaporator, is adapted to be sprayed with a liquid film obtained by injection of solvent originating from the first evaporator.

DESCRIPTION OF THE PREFERRED EMBODIMENTS

The process of the present invention permits one to obtain directly and continuously a renovated working solution without any treatment other than a distillation by evaporation in two stages. In the first distillation stage the solvent(s) is/are distilled under a pressure lower than or equal to atmospheric pressure. The apparatus used is a film evaporator. The film is able either to flow freely or to be forced to follow a longer path by continuously sweeping along walls. In any case, the apparatus advantageously functions with a concentration gradient which permits the evaporation to be completed by injection of steam, even when the extract does not contain more than a few percent of solvent. The first distillation stage is advantageously conducted in the presence of auxiliary steam.

The second distillation stage consists in evaporating the combination of the quinones and light degraded products under a pressure lower than that used in the first distillation stage, and preferably under a pressure lower than 100 mm.Hg. The apparatus chosen is also a film evaporator and producing a concentration gradient, with or without any sweeping action. The wall temperatures should be below 350°C when ethyl anthraquinone and its degraded products are involved. It is advantageous to utilize the effect of the temperature for obtaining a generation of quinones from degraded products which can be regenerated by heat. This is why the pressure in this second distillation stage must be such that the working temperature corresponding to the vaporization of the products to be recovered is sufficiently high for this generation of quinones but is sufficiently low so as not to cause cracking which would lead to formation of undesirable light products. The undistillable residue is brought to a temperature such that some of the degraded products are transformed into useful quinones.

Moreover, in this second distillation stage, one important advantage of the present invention is the procedure for carrying out the condensation of the vapors of quinones and degraded products. As it is desirable to effect the overall treatment continuously, it is advantageous if there can be avoided any appearance of solid phase due to condensation. The melting points of the quinone products are such that, even with hot condensers, it is in practice very difficult to avoid the solid deposits. The process thus consists in condensing the vapors on a liquid film of cold solvent and, for this purpose, there is used the solvent recovered during the first phase.

This process lends itself to the continuous complete treatment of the working solutions. Thus, by utilizing the technique of descending film evaporators for each of the distillation stages, the working solution to be regenerated, which is introduced to the first evaporator, leaves the descending film condenser of the second stage regenerated and immediately ready for use.

For a better understanding of the invention, reference will now be made, by way of example, to the accompanying drawing which shows diagrammatically one embodiment of an installation suitable for carrying out the process of the invention.

The old working solution is passed through the pipe 1, and the solvents are passed through the pipe 2, the molten dry extract is conveyed through the pipe 3, and the molten dry extract and the quinones + "light degraded " are conveyed by the pipes 4 and 5. The regenerated working solution is withdrawn from the pipe 6. The dry residue undistilled is withdrawn from 7.

Through a pipe 1, old or spent working solution to be regenerated is passed through a flow-meter 8 and then by way of a descending liquid film distributor 10 into an evaporator 9. Live steam is injected through a flow-meter 22 and through a pipe 23 into the evaporator 9. Solvent, after passage through a pipe 2 to a condenser 30, is conveyed by a conduit 12 to a separator 14, in which there is separated from the solvent water which is evacuated through outlet 13, whereafter the solvent is drawn into a pipeline 15 and, after passing through a flow-meter 11, is conveyed by way of a descending liquid film distributor 17 to a brine condenser 16.

Molten dry extract which is withdrawn at the base of the film evaporator 9 through a pipe 3, is conveyed to a relay tank 18, and is then circulated from bottom to top through a flow-meter 19 and enters an evaporator 20 by way of a descending liquid film distributor 21. The vapors of quinones and light degraded products leave the evaporator 20 through a pipe 5, which conveys them to a water condenser 16, where they are brought into contact with the solvent. The regenerated working solution is withdrawn through pipe 6. Undistilled residue is withdrawn through an outlet 7 at the base of the evaporator 20.

The invention is further illustrated by the following Examples which are concerned with the application of the process of the invention to a working solution based on 2-ethylanthraquinone(2-EAQ) dissolved in a solvent which is composed of 40% to 50% by volume of methylcyclohexyl acetate and 60% to 50% by volume of a cut of aromatic solvents boiling between 150° and 180°C/760 mm Hg.

EXAMPLE 1

After having separated, during a first distillation, the solvents of a working solution containing 206 g/l of dry extract consisting of 35% of quinones and 65% of degraded products, 236 g of this molten dry extract were placed in a spherical flask connected to the base of a vertical condenser with trickling solvent. When the interior of the vessel had been brought to a pressure of 1 to 2 mm.Hg., the flask was heated. The first vapors started to distil at 50°C, and the second distillation was stopped when a temperature of 250°C was reached. Analysis showed that 145 g of distillate had been condensed, i.e. 62% of the batch, containing 68 g of quinones, i.e. 80% of the initial quinones. The residue contained 17.5 g of quinones, this representing a total chemical yield of quinones of 103%, that is to say, a 3% increase in the amount of quinones.

EXAMPLE 2

The previous experiment was repeated but the second distillation was extended. The condensate then represented 86% of the batch, and contained 103% of the initial quantity of quinones, whilst the residue in addition contained 5% of the initial quantity of quinones, so that the chemical yield was 108%.

EXAMPLE 3

Each of the two distillation stages was carried out continuously in an installation of the type shown in the accompanying drawings. The solvent evaporator was an aluminum tube of internal diameter 30 mm and length 5 m, which was steam-heated to 140°C. The interior of the solvent evaporator was brought to an absolute pressure of 0.2 bar. It was supplied, at the rate of 25 l/h, with a working solution having a concentration of 200 g/l of dry extract, of which 70 g/l were quinones. The throughput was such that 5 kg/h of molten dry extract were obtained. The solvent was recovered. The second evaporator was a tube of internal diameter 15 mm and length 1.5 m, which was heated electrically, so as to obtain a temperature, which increased from top to bottom of the tube from 245° to 320°C. The head pressure was about 1 mm. Hg. This evaporator was supplied, at the rate of 0.5 kg/h, with molten extract heated to 175°C.

The rate of flow of solvent, which was sent to the top of the condenser, was regulated so as to obtain a working solution with a dry extract content equal to or greater than that initially present. Having introduced into the second evaporator 3060 g of solvent and 753.5 g of dry extract, there were collected 3680 g of solution containing 620 g of distillate, i.e. 82.4% of the batch, and 133.5 g of residue. Analysis of the solution and of the residue showed that, for 279.6 g of quinones in the dry extract, there were found 282.4 g thereof in the distillate, i.e. 101% of the initial quantity, and 21.8 g in the residue, i.e. 7.8% of the initial quantity, this bringing the chemical yield to 108.8%. Thus, starting with a dry extract containing 37.2% of quinones, there was obtained a solution of which the extract contained 45.6% of quinones. The speed of reduction of the quinone to hydroquinone became, with the concentration of quinones equal to that of the solution subjected to distillation, higher by 33% than it was for the undistilled solution.

EXAMPLE 4

In order to demonstrate the advantages of the treatment forming the subject of the present invention, comparative tests were carried out concerning the manufacture of hydrogen peroxide from, firstly, spent solution by way of reference and, secondly, from this solution after treatment by distillation.

The continuous production of hydrogen peroxide comprises the essential steps of hydrogenation, oxidation, and extraction of $H_2O_2$, and in addition a "recoversion" step in which 15% of the total rate of flow derived between the extraction and the hydrogenation is continuously treated.

Purification by distillation

Under the working conditions of Example 3, there were obtained in a first step 16,860 g of dry extract originating from 83 liters of working solution. This molten dry extract was sent to the evaporator at the rate of 793 g/h and gave rise to 13,260 g of distillate, i.e. 78.7% of the batch, collected in the form of solution, and 3552 g of residue. The quinone yields were 98.8% in the distillate and 7.7% in the residue, i.e. a total of 106.5%. The solution, after distillation, contained 41.8% of quinones, as compared with 33.6% before distillation. The speed of reduction, with equal concentration of quinones, was increased by this treatment by 21%.

Application to the manufacture of hydrogen peroxide

The two solutions, i.e. treated and untreated, were brought by the addition of 2-ethylanthraquinone (2-EAQ) to an identical concentration of 95 g of quinones per liter. As a result, the compositions at the start of the test were as follows:

| | Concentration: g/l | | | |
|---|---|---|---|---|
| | E.A.Q. | $H_4$ EAQ | total quinones | degraded products | total solution |
| untreated solution | 30.5 | 63.5 | 94.0 | 136.5 | 230.5 |
| treated | | | | | |

-continued

| | Concentration: g/l | | | |
|---|---|---|---|---|
| | E.A.Q. | $H_4$ EAQ | total quinones | degraded products | total solution |
| solution | 31.5 | 64.0 | 95.5 | 96.5 | 192.0 |

A reduction rate, of the quinones of 85% was fixed. As experience has shown that, under the selected working conditions, for this reduction rate, the concentration of tetrahydroethyl anthraquinone ($H_4$EAQ) has a tendency towards a equilibrium value in the region of 80 g/l, it is expedient to make a distinction between three periods, (a), (b) and (c), in the results.

a. An initial period: being the time necessary to obtain a constant procedure with 85% of hydroquinone, that is to say, normal running.

b. A period during which the concentration of $H_4$EAQ increases.

c. A period of stable composition and rate of reduction.

The test lasted a total of eight weeks, and the results obtained are as follows; all being in favor of the treated solution:

1. Speed of reduction, in terms of the time and quantity of catalyst:
   a. the period for producing normal running was half as long and the catalyst consumption was reduced by 33%.
   b. the period for increasing the concentration of $H_4$EAQ was half as long and the saving in catalyst was 35%.
   c. in the stable period, the saving in catalyst was 50%.

2. Speed of degradation, in terms of the quantity of quinone consumed per unit of volume and time, the results are in favor of the treated solution and for periods (a), (b) and (c) are as follows:
   a. 80%;
   b. 55%; and
   c. 45%.

3. With regard to the extraction yield of the hydrogen peroxide and the quality of the $H_2O_2$, it must be pointed out that, taking into account the reduction in concentration of "degraded products", the solution treated by distillation has a smaller aptitude for dissolving the reduction quinones. It is possible to compensate for this disadvantage by increasing the content of methylcyclohexyl acetate in the solvent from 42% to 50%. Experience would suggest that the usual consequence of such a modification in the solvent, all other things being equal, would be:
   i. an increase in the concentration of carbonaceous products in the $H_2O_2$ extract.
   ii. a decrease in the yield of extraction. In actual fact, there has on the contrary been no indication of this. The concentration of the carbonaceous products in the extracted hydrogen peroxide has fallen from 733 to 560 g/l, i.e. a decrease by 23.6%. The extraction yield of the hydrogen peroxide has increased from 93.9% to 98.8%.

EXAMPLE 5

20,245 g of dry extract originating from 101 liters of spent working solution were subjected to distillation under the conditions of Example 4 and at a rate of flow of 757 g/h. 15,728 g of final distillate were obtained, i.e. 77.7% of the batch, in the form of solution and 4417 g of residue. The yield of quinones was 99.7% in the distillate and 6.8% in the residue, i.e. a total of 106.5%.

The dissolved dry extract, after completing treatment, contained 44.5% of quinones as compared with 34.5% before distillation.

The speed of reduction, with equal concentration of quinones, was increased by 16%.

Under working conditions similar to Example 4, tests concerned with the manufacture of $H_2O_2$ permitted the following improvements to be confirmed as compared with the untreated working solution:

a catalyst saving of 30%;
an increase in the quantity of quinones;
and a hydrogen peroxide extraction rate of 99.5% instead of 95.4%.

EXAMPLE 6

A spent working solution, of the same type as that used in the preceding Examples, was treated by distillation in two separate stages, each operating continuously.

Stage 1.

The distillation of the solvents was carried out on a vertical monotubular evaporator of the descending film type with an internal diameter of 30 mm and comprising two sections separated by a chamber for discharge of vapors: the upper section had a length of 3m and the lower section had a length of 2 m, with each section being provided in its upper part with a slotted liquid film distributor. The assembly was supplied at the top with the working solution at the rate of 25 l/h and at the bottom with steam at the rate of 3 kg/h. For both sections, the heating was effected with a steam jacket at 5 bars absolute. The distillation pressure as 150 mm.Hg. The discharged vapors, at 140°C, were introduced into a tubular condenser provided with a separator for separating the water from the solvents. The extract leaves in the molten state at 130°C and contains less than 0.5% of its weight in solvent.

Stage 2.

The distillation of the quinones and light degraded products was effected from reserves of extract and solvents coming from the preceding installation. The distillation was carried out in a descending film, vertical mototubular evaporator with an internal diameter of 85 mm and a length of 3 m, provided in its upper part with a slot-type distributor. The apparatus was supplied at the top with the molten extract at 130°C and at the rate of 13 kg./h. The distillation temperature was 230°C and the residue was brought to a temperature lower than or equal to 350°C. These vapors were directed towards a vertical tubular condenser having a jacket through which cold water was flowing, and composed of two parts between which the vapors to be condensed were introduced into the apparatus. The upper part was supplied at the top by means of a distributor with recovered solvent and provided a liquid film; and the bottom part was provided for terminating the condensation and cooling the liquid. The solvent was introduced at the rate of 30 l/h. The temperature between the two parts of the condenser was in the range of from 75° to 80°C. The cooled condensate finally left at 30°C, at the rate of 40.7 l/h, and with a concentration of extract of 246 g/l. The distillation yield was 77%. For a batch with 38% of quinones: the distillate contained 47.9% of quinones, i.e. a yield of 96.2%, and the residue contained 14% of quinones, i.e. a yield of 4.9%. The chemical yield of quinones was therefore 101%.

EXAMPLE 7

300 cubic metres of a working solution of the type described in Example 6 were treated at the rate of 960 l/h in a continuously operating two-stage installation, of the type shown in the accompanying drawing.

Stage 1.

The evaporator for the solvent was of the type described in Example 6, with tubes hving an internal diameter of 30 mm, in two sections of 3m and 2m lengths. The assembly was heated by steam at 6 bars absolute which was injected at the base of the evaporator at the rate of 100 kg/h of live steam. The distillation pressure was 300 mm.Hg. The vapors left evaporator a 150°C and the extract left the bottom of the evaporator at a temperature of 120°C. The residual content of solvent in the extract was in the region of 1%.

Stage 2.

Dry extract and solvent were supplied from their respective relay tanks: the extract was passed to the top of a film-sweeping evaporator with a surface of 2 $m^2$; and the solvent was sent to the top of a condenser with a surface of 5 $m^2$ and equipped with a liquid film distributor. The evaporator was heated by a double jacket to 340°C., and the distillation pressure was 60 mm.Hg.

The mixture of quinone vapors and light degraded products with the solvent, entering at 40°C, had a temperature of 130°C at the top of the condenser. The analysis results show the efficiency of the treatment:

|  | Concentration: g/l | | |
| --- | --- | --- | --- |
|  | quinones | degraded products | % quinones in solution |
| Solution: | | | |
| before treatment | 72 | 140 | 34 |
| after treatment | 73 | 90 | 45 |

The rate of flow obtained solution was 900 l/h and the rate of flow of residue was 57 kg/h. The distillate was thus a 34% of quinones, i.e. a yield of 95%. The residue had 15.6% of quinones, i.e. a yield of 12.9%. The chemical yield of quinone was thus 107.9%.

We claim:

1. In the process for regenerating a working solution used in a cyclic process for the manufacture of hydrogen peroxide operated on the basis of a cycle comprising hydrogenation, in contact with a catalyst, of a working solution comprising anthraquinones dissolved in a solvent to form hydroanthraquinones, oxidation of the hydroanthraquinones formed in the hydrogenation step to produce hydrogen peroxide, extraction to recover substantially all of the hydrogen peroxide from the working solution, thereby producing an exhausted working solution, and recycling the exhausted working solution, and recycling the exhausted working solution to the hydrogenation stage, which regenerating process comprises distilling the exhausted working solution to first recover the solvent and to second recover quinones and monoanthracene light degraded products, the improvement wherein:

said distilling step comprises continuous multistage thin film distillation, wherein a first distillation stage comprises continuously distilling the exhausted working solution by film evaporation under a pressure not greater than atmospheric pressure, separating the solvent as overheads from the working solution in said first distillation stage, and feeding the residual molten extract from the bottoms stream of said first distillation stage to a second distillation stage, and wherein the second distillation stage comprises continuously separating quinones and monoanthracene light degraded products by film evaporation, as overheads, from an undistillable bottoms residue, under a pressure lower than the pressure employed in the first distillation stage, and wherein said distilling step further includes the step of continuously condensing the vapors formed in the second distillation stage on a liquid film of cold solvent which is being constantly renewed and which originates from the vapors condensed in the first distillation stage, the product of said condensing step being used as a new working solution.

2. A process for regenerating a working solution according to claim 1, wherein the undistillable residue of the second distillation stage is brought to a temperature such that some of the degraded products are transformed into useful quinones.

3. A process for regenerating a working solution according to claim 1, wherein the second distillation stage is carried out under a pressure such that the temperature corresponding to the vaporization of the products to be recovered is relatively high for the generation of quinones, but sufficiently low as not to cause cracking which leads to the formation of undesirable light degraded products.

4. A process for regenerating a working solution according to claim 3, wherein the second distillation stage is carried out under a pressure lower than about 100 mm.Hg.

5. A process for regenerating a working solution according to claim 1, wherein the first distillation stage is carried out in the presence of auxiliary steam.

* * * * *